US011461913B2

(12) United States Patent
Narang et al.

(10) Patent No.: US 11,461,913 B2
(45) Date of Patent: *Oct. 4, 2022

(54) DISTANCE MEASUREMENT DEVICE

(71) Applicant: Panavision International, L.P., Woodland Hills, CA (US)

(72) Inventors: Ritesh Narang, Santa Clarita, CA (US); William Bennett Hogue, Jr., Simi Valley, CA (US); Clive Austin Towndrow, West Hills, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,888

(22) Filed: Mar. 10, 2020

(65) Prior Publication Data

US 2020/0280672 A1 Sep. 3, 2020

Related U.S. Application Data

(63) Continuation of application No. 15/472,116, filed on Mar. 28, 2017, now Pat. No. 10,587,792, which is a (Continued)

(51) Int. Cl.
*H04N 5/232* (2006.01)
*H04N 5/445* (2011.01)
(Continued)

(52) U.S. Cl.
CPC .............. *G06T 7/593* (2017.01); *G06F 3/041* (2013.01); *H04N 5/2251* (2013.01);
(Continued)

(58) Field of Classification Search
CPC .......... H04N 5/23212; H04N 13/0239; H04N 5/247; H04N 5/23216; H04N 5/2259;
(Continued)

(56) References Cited

U.S. PATENT DOCUMENTS 5,166,533 A * 11/1992 Kajiwara ................ G01S 11/12
250/559.05
5,175,616 A * 12/1992 Milgram ................ G03B 35/08
348/47
(Continued)

FOREIGN PATENT DOCUMENTS

EP 2608551 A2 6/2013
JP 2608996 B2 5/1997
(Continued)

OTHER PUBLICATIONS

Schreer et al.: "Real-Time Disparity Analysis for Applications in Immersive Tele-Conference Scenarios—A Comparative Study", Image Analysis and Processing, 2001. Proceedings. 11th International Conference On Sep. 26-28, 2001, Piscataway, NJ, USA, IEEE, Sep. 26, 2001 (Sep. 26, 2001), pp. 346-351, XP010561271, ISBN: 978-0-7695-1183-2.

(Continued)

*Primary Examiner* — Hung H Lam
(74) *Attorney, Agent, or Firm* — Snell & Wilmer L.L.P.

(57) ABSTRACT

A system for determining a distance to a region of interest. The system may be used to adjust focus of a motion picture camera. The system may include a first camera configured to have a first field of view, and a second camera configured to have a second field of view that overlaps at least a portion of the first field of view. The system may include a processor configured to calculate a distance of the selected region of interest relative to a location by comparing a position of the selected region of interest in the first field of view with a position of the selected region of interest in the second field of view.

15 Claims, 19 Drawing Sheets

Related U.S. Application Data continuation of application No. 14/495,862, filed on Sep. 24, 2014, now Pat. No. 9,609,200.

(51) Int. Cl.

| | | |
|---|---|---|
| *G06T 7/593* | (2017.01) | |
| *H04N 5/247* | (2006.01) | |
| *H04N 5/225* | (2006.01) | |
| *G06F 3/041* | (2006.01) | |
| *H04N 13/239* | (2018.01) | |
| *H04N 13/246* | (2018.01) | |
| *H04N 13/00* | (2018.01) | |
| *G06F 3/04842* | (2022.01) | |
| *G06F 3/0488* | (2022.01) | |

(52) U.S. Cl.
CPC ......... *H04N 5/2252* (2013.01); *H04N 5/2258* (2013.01); *H04N 5/2259* (2013.01); *H04N 5/23212* (2013.01); *H04N 5/23216* (2013.01); *H04N 5/23293* (2013.01); *H04N 5/247* (2013.01); *H04N 5/44504* (2013.01); *H04N 13/239* (2018.05); *G06F 3/0488* (2013.01); *G06F 3/04842* (2013.01); *G06F 2203/04101* (2013.01); *H04N 13/246* (2018.05); *H04N 2013/0081* (2013.01); *H04N 2213/001* (2013.01)

(58) Field of Classification Search
CPC ............. H04N 5/23293; H04N 5/2252; H04N 5/2258; H04N 2013/0081; H04N 13/0246; G06T 7/0075; G06F 3/041; G06F 2203/04101

See application file for complete search history.

(56) References Cited

U.S. PATENT DOCUMENTS

| | | | |
|---|---|---|---|
| 7,184,088 B1* | 2/2007 | Ball | G01C 11/02 348/348 |
| 7,697,724 B1 | 4/2010 | Gao et al. | |
| 8,866,920 B2 | 10/2014 | Venkataraman et al. | |
| 9,609,200 B2 | 3/2017 | Narang et al. | |
| 10,587,792 B2 | 3/2020 | Narang et al. | |
| 2001/0055418 A1* | 12/2001 | Nakamura | G06T 7/97 382/154 |
| 2005/0270369 A1* | 12/2005 | Nonaka | H04N 5/232411 348/61 |
| 2010/0247088 A1 | 9/2010 | Campbell et al. | |
| 2012/0140038 A1 | 6/2012 | Bi et al. | |
| 2012/0218418 A1* | 8/2012 | Strandemar | G01J 5/0859 348/164 |
| 2014/0063287 A1 | 3/2014 | Yamada | |
| 2014/0247344 A1 | 9/2014 | Fujiwara | |
| 2015/0187091 A1 | 7/2015 | Hata et al. | |

FOREIGN PATENT DOCUMENTS

| | | |
|---|---|---|
| JP | 2000112019 A | 4/2000 |
| JP | 201093422 A | 4/2010 |
| JP | 2011211531 A | 10/2011 |
| JP | 201228915 A | 2/2012 |
| JP | 2012145813 A | 8/2012 |
| JP | 2021151526 A | 8/2012 |
| JP | 2012245066 A | 12/2012 |
| JP | 2013086959 A | 5/2013 |
| JP | 2013174510 A | 9/2013 |
| WO | 2010099495 A2 | 9/2010 |
| WO | 2013047482 A1 | 4/2013 |
| WO | 2013167901 A1 | 11/2013 |
| WO | 2014006832 A1 | 1/2014 |

OTHER PUBLICATIONS

Atzapadin et al.: "Stereo Analysis By Hybrid Recursive Matching for Real-Time Immersive Video Conferencing", IEEE Transactions On Circuits and Systems for Video Technology, IEEE Service Center, Piscataway, NJ, US, vol. 14, No. 3, Mar. 1, 2004 (Mar. 1, 2004), pp. 321-334, XP001190157, ISSN: 1051-8215, DOI: 10.1109/TCSVT.2004.823391.
International Search Report dated Jan. 19, 2016 for corresponding International Application No. PCT/US2015/051598 filed Sep. 23, 2015; total 5 pages.
Written Opinion of the International Searching Authority dated Jan. 19, 2016 for corresponding International Application No. PCT/US2015/051598 filed Sep. 23, 2015; total 10 pages.
International Preliminary Report on Patentability dated Mar. 28, 2017 for corresponding International Application No. PCT/US2015/051598 filed Sep. 23, 2015; total 10 pages.
Restriction Requirement dated Dec. 31, 2015 in corresponding U.S. Appl. No. 14/495,862, filed Sep. 24, 2014; total 5 pages.
Non-Final Rejection dated Jun. 17, 2016 in corresponding U.S. Appl. No. 14/495,862, filed Sep. 24, 2014; total 17 pages.
Notice of Allowance dated Nov. 15, 2016 in corresponding U.S. Appl. No. 14/495,862, filed Sep. 24, 2014; total 8 pages.
Restriction Requirement dated Jun. 1, 2018 in corresponding U.S. Appl. No. 15/472,116, filed Mar. 28, 2017 total 5 pages.
Non-Final Office Action dated Nov. 19, 2018 in corresponding U.S. Appl. No. 15/472,116, filed Mar. 28, 2017; total 20 pages.
Notice of Allowance dated Jun. 11, 2019 in corresponding U.S. Appl. No. 15/472,116, filed Mar. 28, 2017; total 11 pages.
Notice of Allowance dated Nov. 20, 2019 in corresponding U.S. Appl. No. 15/472,116, filed Mar. 28, 2017; total 9 pages.
Olivier Faugeras: "Three-Dimensional Computer Vision",Three-Dimensional Computer Vision: A Geometric Viewpoint, pp. 175-189, XP002371719.
Tanger R et al.: "Trinocular Depth Acquisition", SMPTE—Motion Imaging Journal, Society of Motion Picture and Television Engineers, White Plains, NY, US, vol. 116, No. 5, May 1, 2007 (May 1, 2007), pp. 206-211, XP001541217, ISSN: 0036-1682.
Richard Hartley and Andrew Zisserman, Multiple View Geometry, CVPR Jun. 1999; total 57 pages.

\* cited by examiner

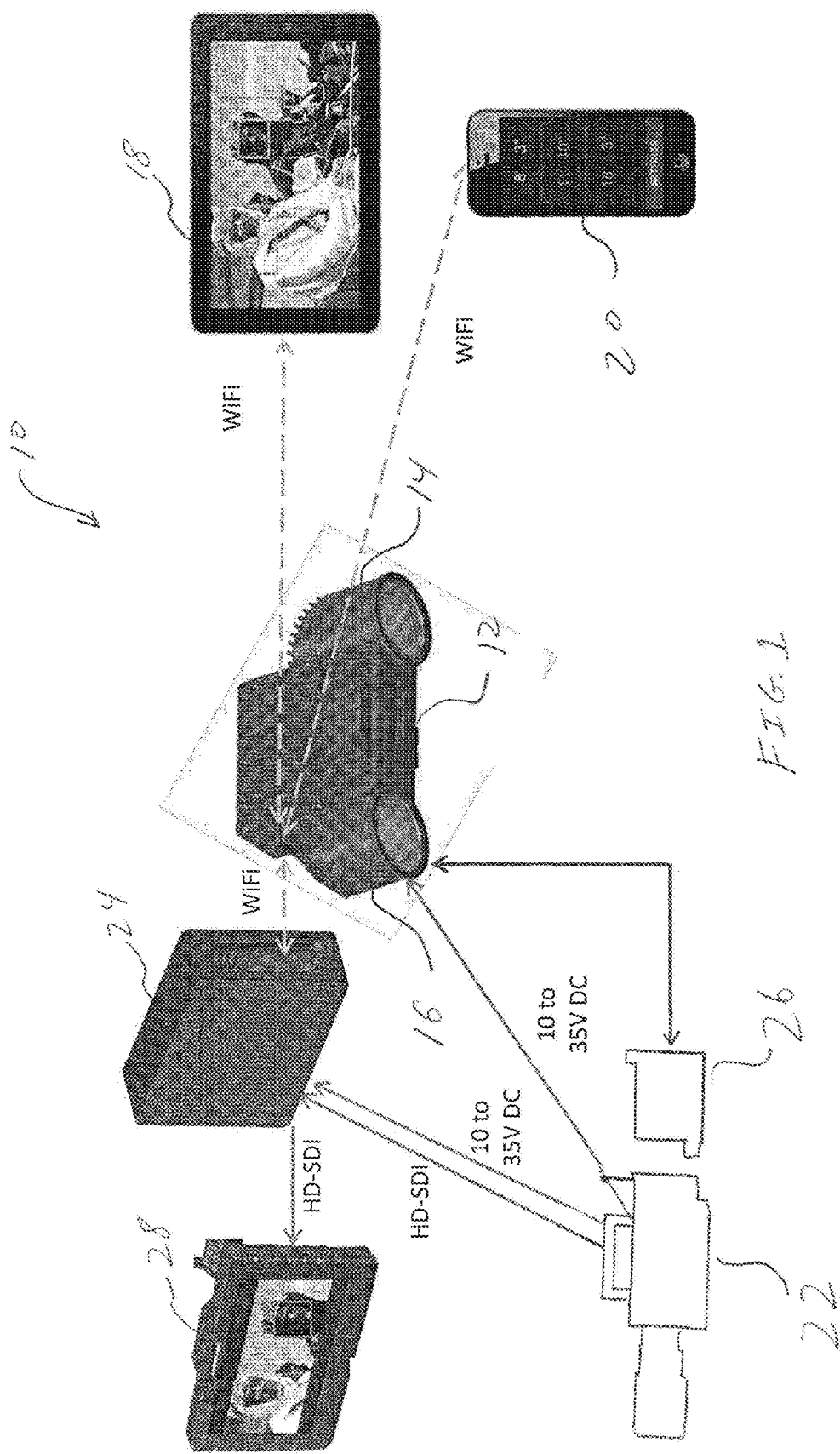

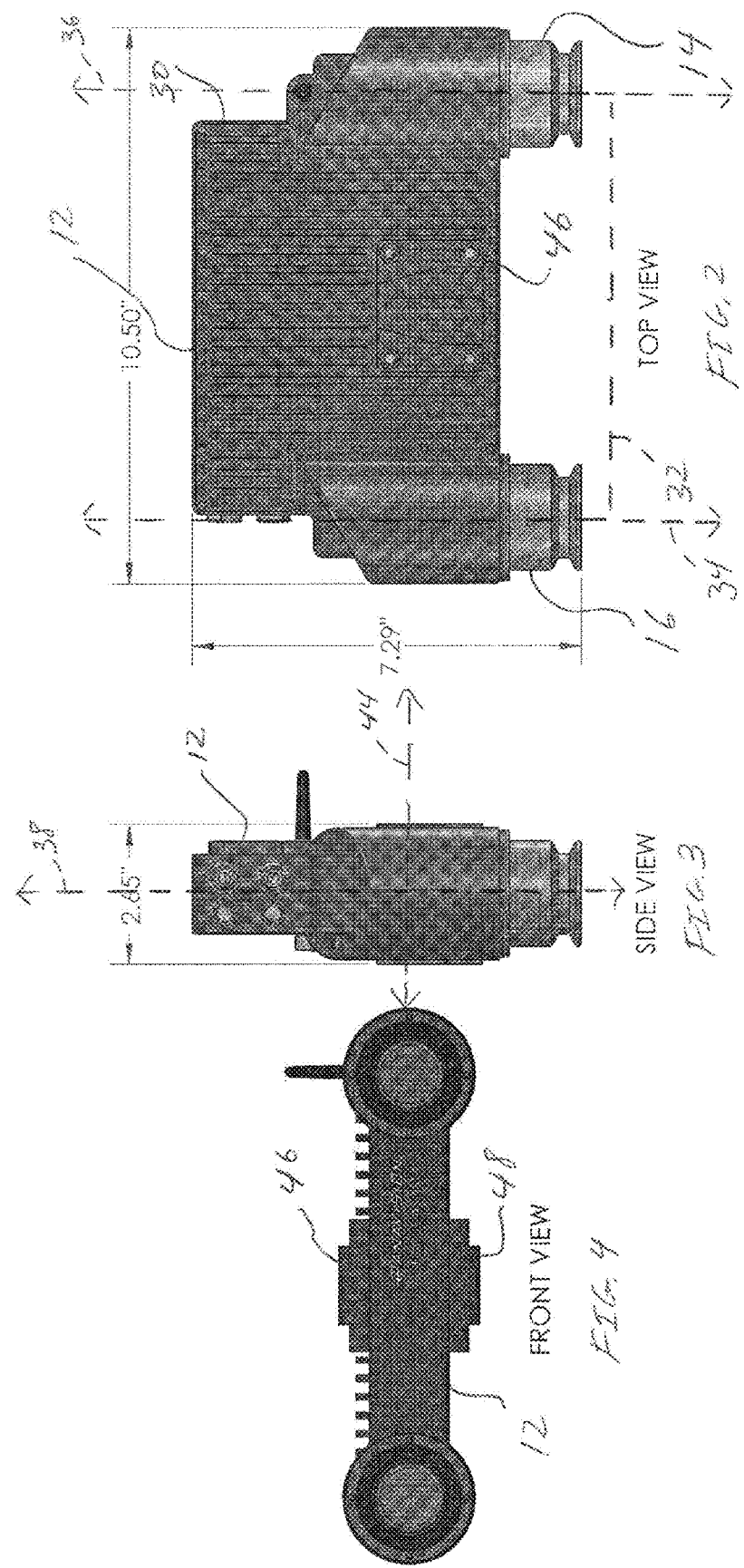

$$R(x,y) = \frac{\sum_{x',y'}(T'(x',y') \cdot I'(x+x',y+y'))}{\sqrt{\sum_{x',y'}T'(x',y')^2 \cdot \sum_{x',y'}I'(x+x',y+y')^2}}$$

- with I as the image, T as the template, R as the result and $T'(x',y') = T(x',y') - 1/(w \cdot h) \cdot \sum_{x'',y''}T(x'',y'')$ $I'(x+x',y+y') = I(x+x',y+y') - 1/(w \cdot h) \cdot \sum_{x'',y''}I(x+x'',y+y'')$

FIG. 9

Theoretical Resolution for 12.5mm Focal length
- For 8" interocular spacing (F/1.4)

| Range | F=12.5mm (~26° FOV) Inch/Pixel disparity |
|---|---|
| 5' | 0.079" |
| 10' | 0.316" |
| 15' | 0.710" |
| 20' | 1.261" |
| 25' | 1.967" |
| 30' | 2.829" |
| 35' | 3.845" |
| 40' | 5.016" |
| 45' | 6.340" |

FIG. 12

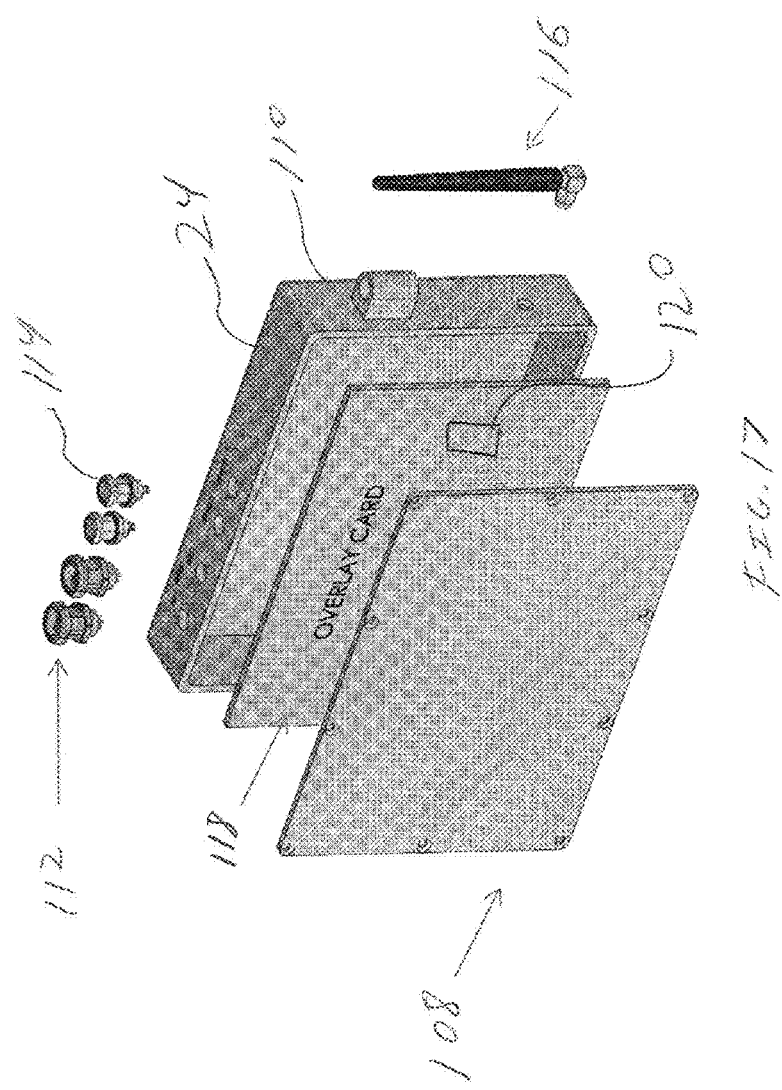

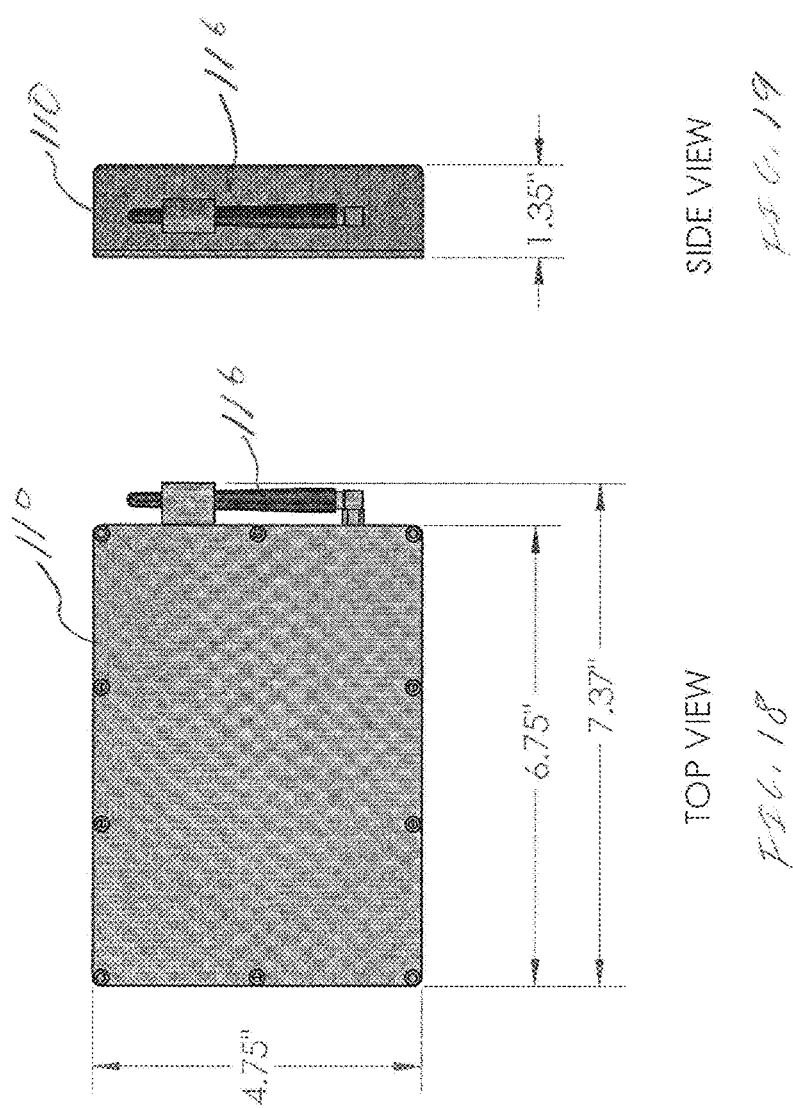

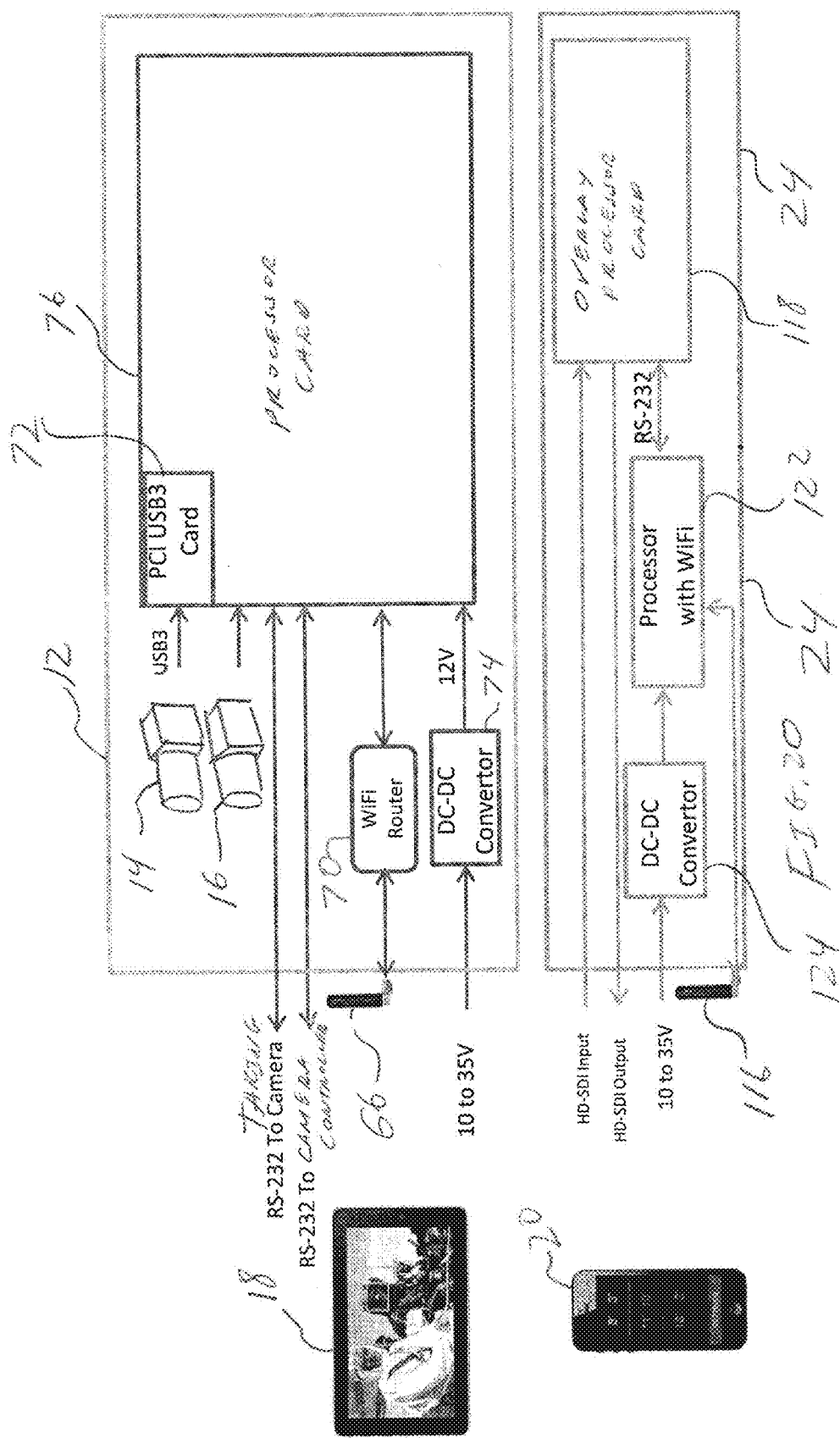

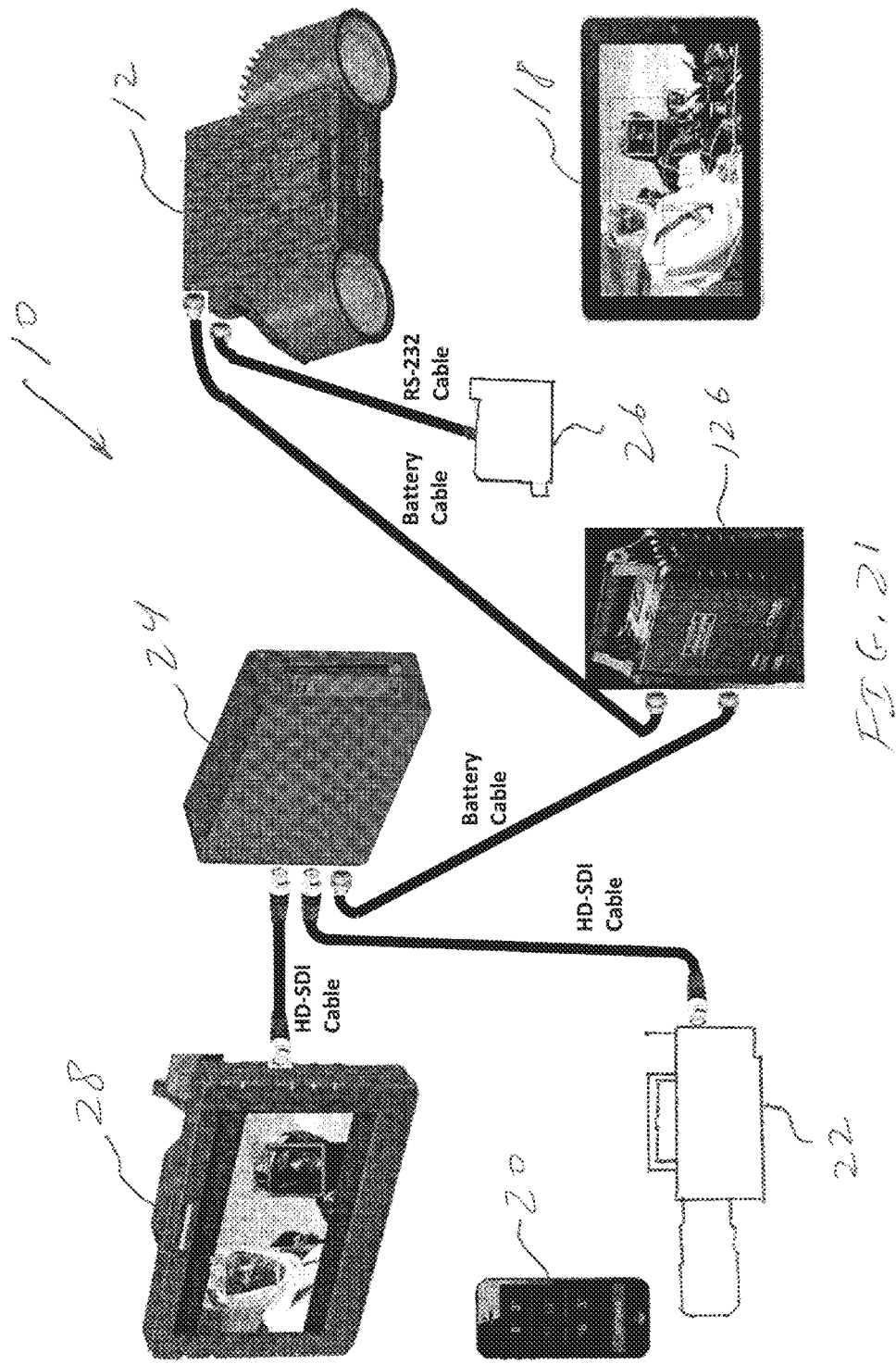

- Use DATA (04)

DATA        (04)

The DATA command is used to transfer data between the client and the MDR. The first data byte (Data Description byte) indicates what data is sent and is followed by the actual data (2-bytes each). This command can have two different meanings:

- When the DATA command is sent with one data byte (Data Description byte), it is interpreted by the MDR as the request for data, where the Data Description byte indicates what data is requested.
  - If the packet contains: 3, 5, 7, 9, 11 or 13 bytes, DATA contains requested data. The first data byte (Data Description byte) indicates what data was sent. Lower selected data goes first (Iris, Focus, Zoom...)

*Data Description byte*

| Distance | Speed | Shutter | Zoom | Focus | Iris |
  |----------|-------|---------|------|-------|------|

Bits 7,8 – Reserved

*Example where the client is requesting Iris and Focus data:*

Client: 02 00 04 30 21 20 33 20 41 03
  MDR: 06 (ACK)
  MDR sends I&F data (03B2E, 0373E):

02 00 04 30 35 30 33 30 42 32 45 32 37 41 36 30 40 03
  Client: 06 (ACK)

Command to Read:
- Zoom (Encoder count, Linear)
- Focus (Encoder count, Non-Linear)
- Iris (Encoder count, Non-Linear)

FIG. 23

DIST (10)

*Distance*

Command to MDR / sending distance data. The Client sends DIST command with 4 bytes of data, that represents the information of the distance from the Client. Format of the DIST data is:

The first data byte is Source Identification byte

| 7 | 6 | 5 | 4 | 3 | 2 | 1 | 0 |
|---|---|---|---|---|---|---|---|
|   |   |   |   | SN | CT | PT | LR |

LR .......... Light Ranger
PT .......... Panatape
CT .......... Cinetape
SN .......... Sniper Followed by three bytes of distance information in [mm]

- Use DIST (10) Command to Display Distance to The Preston Controller
- The First Byte will Set To Hex(02) for PT Panatape
- The Distance Of The First Track is sent To MDR for display

FIG. 24

DISTANCE MEASUREMENT DEVICE

CROSS-REFERENCE TO RELATED APPLICATIONS

This patent application is a continuation of and claims priority to U.S. application Ser. No. 15/472,116 filed Mar. 28, 2017, now U.S. Pat. No. 10,587,792, which is a continuation of U.S. patent application Ser. No. 14/495,862 filed Sep. 24, 2014, now U.S. Pat. No. 9,609,200 issued Mar. 28, 2017, which applications are herein incorporated by reference in their entirety.

FIELD

The present disclosure relates to systems, apparatuses, and methods for determining distances to regions of interest.

BACKGROUND

Determining distance to a region of interest is pertinent for proper camera operation, including properly setting focus of a taking camera. For professional level filming, including filming for motion pictures and television, it is particularly pertinent to properly determine the distance to regions of interest. A camera assistant may be tasked with determining the distance to regions of interest and then setting the focus of a taking camera based on that distance.

Prior systems, apparatuses, and methods of determining distance to a region of interest suffer from a series of drawbacks. Systems such as acoustic or infrared measurement devices may not properly identify a desired region of interest, and may not properly track movement of a region of interest. In addition, prior systems may not allow the desired region of interest to be readily visualized.

SUMMARY

The systems, apparatuses, and methods disclosed herein are intended to provide for improved determination of distance to a region of interest. The determination of distance may be used to properly set the focus of a taking camera.

Embodiments of the present disclosure may include determination of the distance to a region of interest through use of cameras positioned in a stereoscopic orientation. The disparity of the region of interest through the view of the two cameras is inversely proportional to the distance of the region of interest from the cameras. The distance to the region of interest may be determined based on this disparity.

Embodiments of the present disclosure may allow for tracking movement of the region of interest. Embodiments of the present disclosure may allow for real time calculation of the distance to the region of interest. Embodiments of the present disclosure may allow for multiple regions of interest to be tracked simultaneously, and the field of view of either camera to be produced on a display.

The systems, apparatuses, and methods disclosed herein enhance the ease of determination of distance to a region of interest, and produce improved information regarding the distance to the region of interest.

BRIEF DESCRIPTION OF THE DRAWINGS

Features and advantages of the systems, apparatuses, and methods as disclosed herein will become appreciated as the same become better understood with reference to the specification, claims, and appended drawings wherein:

FIG. 1 illustrates a schematic view of a system according to an embodiment of the present disclosure.

FIG. 2 illustrates a top view of an apparatus according to an embodiment of the present disclosure.

FIG. 3 illustrates a side view of the apparatus shown in FIG. 2 according to an embodiment of the present disclosure.

FIG. 4 illustrates a front view of the apparatus shown in FIG. 2 according to an embodiment of the present disclosure.

FIG. 9 illustrates an algorithm according to an embodiment of the present disclosure.

FIG. 10 illustrates a region of interest according to an embodiment of the present disclosure.

FIG. 11 illustrates a calibration table according to an embodiment of the present disclosure.

FIG. 12 illustrates a resolution table according to an embodiment of the present disclosure.

FIG. 17 illustrates a top perspective view of an apparatus with components separate, according to an embodiment of the present disclosure.

FIG. 18 illustrates a top view of the apparatus shown in FIG. 17, according to an embodiment of the present disclosure.

FIG. 19 illustrates a side view of the apparatus shown in FIG. 18, according to an embodiment of the present disclosure.

FIG. 20 illustrates a schematic view of a hardware configuration, according to an embodiment of the present disclosure.

FIG. 21 illustrates a schematic view of wired connections of a system, according to an embodiment of the present disclosure.

FIG. 23 illustrates a process to transfer data to and from a camera controller, according to an embodiment of the present disclosure.

FIG. 24 illustrates a process to transfer distance data to a camera controller, according to an embodiment of the present disclosure.

DETAILED DESCRIPTION

Figure 5:
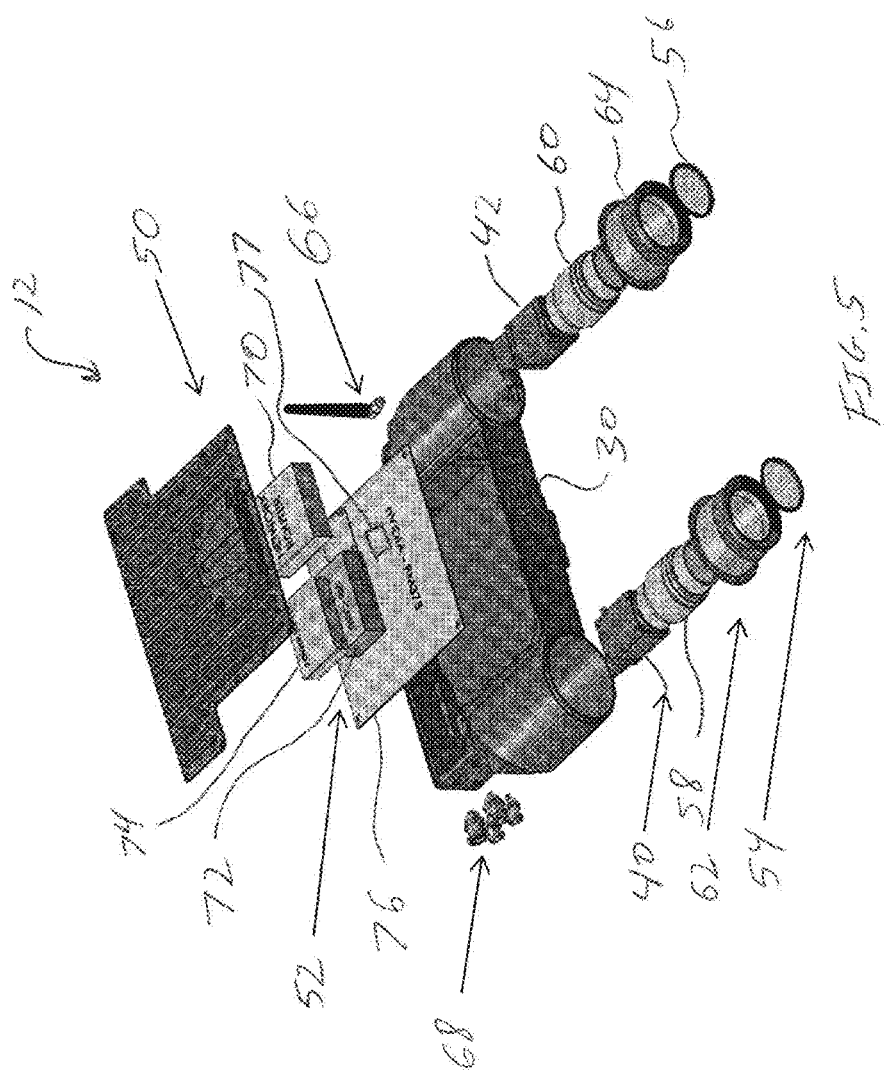
FIG. 5 illustrates a top perspective view of the apparatus shown in FIG. 2 with components separate, according to an embodiment of the present disclosure.

FIG. 1 illustrates an embodiment of a system 10 for determining a distance to a region of interest. The system 10 may be used in motion picture camera applications, to more easily allow a taking camera to be focused on a desired region of interest.

The system 10 may include a camera device 12. The camera device 12 may include two cameras 14, 16 each having a respective field of view. The system 10 may include a control device 18 for selecting a region of interest in the field of view of one of the cameras 14, 16. The system 10 may include a display device 20 configured to display a distance to a region of interest calculated by a processor of the system 10.

The system 10 may include a taking camera 22, a display device 24, a camera controller 26, and a display device 28. The taking camera 22 may be configured to produce an image in a field of view that overlaps the fields of view of the cameras 14, 16. The display device 24 may be in the form of an overlay device, for overlaying a distance calculated by a processor of the system 10 on an image from a taking camera 24. The camera controller 26 may be configured to control the operation of the cameras 14, 16. The display device 28 may display an image from the taking device 22 including an overlay from the overlay device. Elements of the system 10 may be excluded, or additional elements may be included to produce a desired result.

The camera device 12 may include two cameras 14, 16. The two cameras 14, 16 may be positioned in a stereoscopic orientation. The field of view of one camera 14 may overlap the entirety of the field of view of the other camera 16, or only a portion of the field of view of the other camera 16, such that at least a portion of the respective fields of view are overlapped.

Referring to FIG. 2, each camera 14, 16 may be coupled to a housing 30. The housing 30 may retain the cameras 14, 16 at a distance 32 from each other. The housing 30 may set the cameras 14, 16 in position and define the distance 32 between the two cameras 14, 16.

Each camera 14, 16 may be aligned along a respective axis 34, 36. The axes 34, 36 may be substantially parallel to each other. The cameras 14, 16 may be oriented substantially co-planar with each other, being aligned in a substantially similar horizontal, or x-dimension, plane 38 extending out of the page in FIG. 3. The camera image sensors 40, 42 shown in FIG. 5 may be oriented substantially co-planar with each other, being aligned in a substantially similar vertical, or y-dimension, plane 44 extending out of the page in FIG. 3. The cameras 14, 16 may be oriented such that they face towards the same direction. The cameras 14, 16 may be retained by the housing 30 such that the orientation of each camera 14, 16 is fixed. In one embodiment, either camera 14, 16 may be configured to be movable relative to the housing 30 and/or other camera 14, 16. In one embodiment, either camera 14, 16 may not be coupled to a housing 30. The cameras may be separable cameras able to be set up in a desired orientation, including an orientation described in regard to the cameras coupled to the housing 30.

The focal length of each camera may be set as desired, and is preferably set such that the fields of view of the two cameras 14, 16 overlap. In one embodiment, the focal length of each camera 14, 16 may be between approximately 12 mm and 16 mm, inclusive. In one embodiment, the focal length of each camera 14, 16 may be set to be the same or substantially similar. In such an embodiment, the similar or identical focal length may reduce the amount of processing that is used to determine distance. In one embodiment, different focal lengths of the cameras may be used as desired.

The camera unit 12 may be configured to be lightweight and portable. As shown in FIG. 2, the length of the camera unit 12 may be approximately 7.29 inches, and the width may be approximately 10.5 inches. The height as shown in FIG. 3 may be approximately 2.65 inches. The dimensions shown in FIGS. 2 and 3 are exemplary, as varied dimensions may be utilized, including a length of between approximately 5 and 10 inches, a width of between approximately 7 and 13 inches, and a height of between approximately 1 and 5 inches. In one embodiment, dimensions different from those stated herein may be utilized. The housing 30 may include attachment devices 46, 48 configured to allow the camera unit 12 to connect to other structures or elements of the system 10. Either of the attachment devices 46, 48 may allow the camera unit 12 to be retained in a desired orientation. Either of the attachment devices 46, 48 may allow the camera unit 12 to couple to the taking camera 22. The attachment devices 46, 48 may be dovetail devices as shown in FIG. 2, or may have other forms as desired.

FIG. 4 illustrates a front view of the camera unit 12. FIG. 5 illustrates the housing 30 with a lid 50 removed. The cameras 14, 16 are shown separated into components. The internal hardware of the camera unit 12 is visible. The cameras 14, 16 may include a respective front window 54, 56, a respective lens assembly 58, 60, and a respective image sensor 40, 42. A respective front bezel 62, 64 may secure the lens assembly 58, 60 to the housing 30. Each lens assembly 58, 60 may include a single lens, or multiple lenses. In one embodiment, the lens assembly 58, 60 may include a zoom lens. In one embodiment, the lens assembly 58, 60 may be configured to control the focus, zoom, and/or iris of the respective camera 14, 16. The image sensors 40, 42 may each be configured to capture an image of the respective field of view and digitize it for processing. The image sensors 40, 42 may be CCD sensors, CMOS sensors, or other forms of image sensor. The image sensors 40, 42 may be capable of producing resolutions of 720p, 1080i, 1080PsF, 1080p, although other resolutions may be used if desired. The image sensors are preferably configured to capture video images. Frame rates of 23.98, 24, 25, 29.97, 30, 48, 50, 59.94 and 60 may be utilized, although other frame rates may be used if desired. In one embodiment, the cameras 14, 16 may be configured to capture static images.

The cameras 14, 16 may be configured to each have a field of view of between approximately 80 to 90 degrees, inclusive, in the horizontal, or x-dimension. Preferably, each camera 14, 16 has a field of view of approximately 90 degrees in the horizontal, or x-dimension. In one embodiment, a lesser or greater angle for each camera 14, 16 may be utilized if desired.

In one embodiment, the features of the camera 14, 16 may be set to be the same or substantially similar. In such an embodiment, the similar or identical features of the cameras 14, 16 may reduce the amount of processing used to determine distance.

Referring to FIG. 2, the distance 32 between the two cameras 14, 16 may be between approximately 5 to 14 inches, inclusive. The distance 32 is preferably approximately 8 inches. In one embodiment, a lesser or greater distance 32 between the cameras 14, 16 may be utilized if desired.

Referring back to FIG. 5, the camera device 12 may include an input device, and may include an output device. In the embodiment shown in FIG. 5, the input device and the output device are a wireless communication device in the form of an antenna 66. In one embodiment, the input device and the output device may comprise connectors such as the connectors 68 shown in FIG. 5. In one embodiment, the input device and output device may comprise different structures. The input device may be configured to receive data, and the output device may be configured to output data. The camera device 12 may also include power connectors 68 that receive power for operating the camera device 12. The voltage utilized by the camera device 12 may range between approximately 12V and 24V, inclusive, or approximately 10V and 35V, inclusive. In one embodiment, a lesser or greater amount of voltage may be utilized if desired. Power connectors 68 and other forms of connectors may be grouped together in proximity on the housing 30.

The camera device 12 may include a wireless communication card 70. The wireless communication card 70 may operate to transmit data to and from the antenna 66. The wireless communication card 70 may be in the form of a router and may operate as a network hub for wireless communication with other devices that may be used in the system 10. The camera device 12 may include an interface device 72 for communication with the first camera 14 and/or the second camera 16. The interface device 72 may be in the form of a USB card. The camera device 12 may include a power supply 74 for processing and supplying power to the components of the camera device 12. The power may be input to the power supply 74 from the power connectors 68. In one embodiment, the power supply 74 may be in the form of a DC-DC converter, although other forms of power supplies 74 may be used in embodiments as desired.

The camera device 12 may include a processor card 76. The processor card 76 may include a processor 77 that is configured to process images that are received from the first camera 14 and the second camera 16. The processor 77 may be used to calculate distance to a region of interest.

Figure 6:
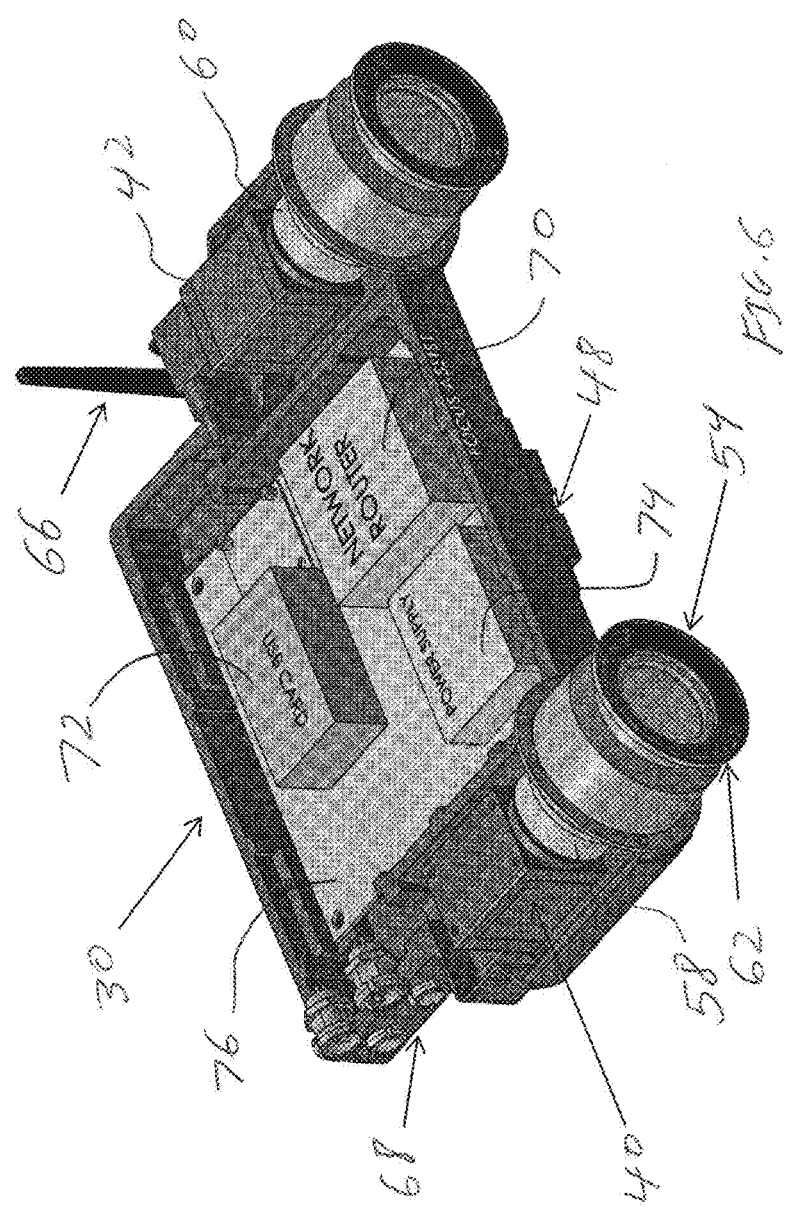
FIG. 6 illustrates a top perspective view of the apparatus shown in FIG. 2 with a lid of a housing removed, according to an embodiment of the present disclosure.

FIG. 6 illustrates components of the camera device 12 in position in the housing 30, with a lid 50 of the housing 30 removed.

Figure 7:
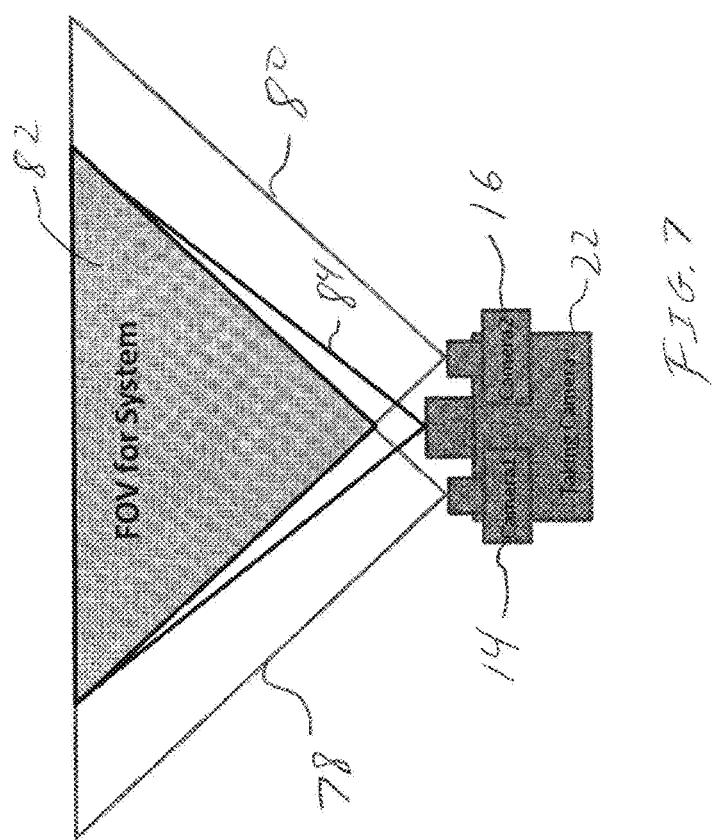
FIG. 7 illustrates a schematic view of fields of view according to an embodiment of the present disclosure.

Referring to FIG. 7, the field of view 78 of the first camera 14, and the field of view 80 of the second camera 16, may have a portion of overlapping field of view 82. In one embodiment, the field of view 84 of the taking camera 22 may overlap at least a portion of either field of view 78, 80. A region of interest may be selected within the field of view 78 and/or field of view 80. The region of interest may be any image shown in either field of view 78, 80, such as an object or area. The region of interest may be a point or collection of points. In one embodiment, the region of interest may have a defined size, such as a size of 80×80 pixels. In one embodiment, the region of interest may have a different size, or may not have a defined size, as desired.

Figure 8:
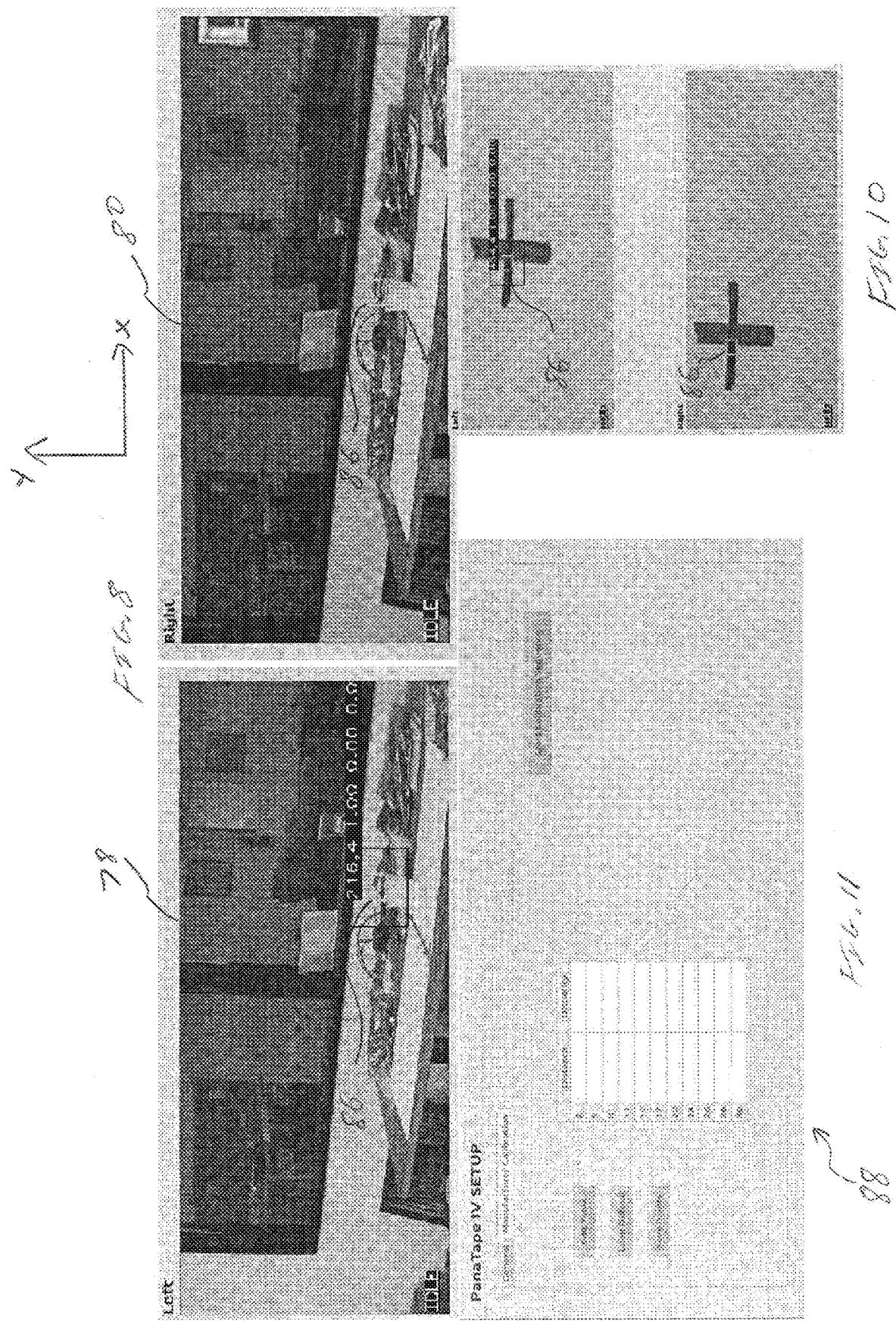
FIG. 8 illustrates an image of fields of view according to an embodiment of the present disclosure.

FIG. 8 shows an example image of a field of view 78 produced by a camera 14, on the left side of FIG. 8. FIG. 8 shows an example image of a field of view 80 produced by a camera 16, on the right side of FIG. 8. The fields of view 78, 80 overlap, as shown by the portions of the images of the fields of view 78, 80 that are similar in both images. The fields of view 78, 80 are offset, as shown by the portions of the field of view 78 that is not shown in the field of view 80. A region of interest 86 has been selected. In one embodiment, the region of interest 86 may be selected automatically by the processor 77, or other automatic process. In one embodiment, the region of interest 86 may be selected by a user's input.

In one embodiment, the region of interest 86 may be selected in one of the fields of view 78, 80. For example, the region of interest 86 may be selected in the field of view 78, which may be referred to as a first field of view 78. The processor 77 may be configured to identify features of the region of interest 86, for example, the appearance of the selected region of interest 86, and may use an algorithm to match the appearance of the selected region of interest 86 in the other field of view 80, which may be referred to as a second field of view 80. The algorithm may correlate the appearance of the selected region of interest 86 in the first field of view 78 with the appearance of the selected region of interest 86 in the second field of view 80.

FIG. 9 illustrates an embodiment of an algorithm that may be used to correlate the appearance of the selected region of interest 86 in the first field of view 78 with the appearance of the selected region of interest 86 in the second field of view 80. The element "T" represents the appearance of the image of the selected region of interest 86. The element "I" represents the image of the second field of view 80. The "x" and "y" elements correspond to the respective "x" and "y" dimensions of the fields of view as marked in FIG. 8. The "w" and "h" elements correspond to the width and height of the fields of view. The element "R" represents the correlation between the appearance of the selected region of interest 86 in the first field of view 78 with the appearance of the selected region of interest 86 in the second field of view 80. The processor 77 may use the algorithm, scanning through the image of the second field of view 80, to find a peak correlation. In one embodiment, an algorithm that differs from the algorithm shown in FIG. 9 may be used by the processor 77.

In one embodiment, a matching algorithm may not be used, and a user may identify the selected region of interest 86 in both the first field of view 78 and the second field of view 80.

The processor 77 may be configured to calculate a distance of the region of interest 86 relative to a location by comparing a position of the region of interest 86 in the first field of view 78 to the position of the region of interest 86 in the second field of view 80. FIG. 10, for example, displays the relative position of the region of interest 86 as shown through the first camera 14 (top image) as compared to the position of the region of interest 86 as shown through the second camera 16 (bottom image). The processor 77 may identify the position of the region of interest in the second field of view 80 through the matching algorithm discussed above, or through an alternative process if desired. The difference in the location of the region of interest 86 in the first field of view 78 and the second field of view 80 is the disparity between the locations. The difference in the location of the region of interest 86 may be the difference in location of the peak correlation calculated using a matching algorithm.

The disparity may be calculated as a difference in position in the horizontal, or x-dimension, of the region of interest 86 in the first field of view 78 relative to the position of the region of interest 86 in the second field of view 80 in the horizontal, or x-dimension. The disparity may be calculated based on a difference of the pixel location of the region of interest 86 in the first field of view 78 and the second field of view 80. In one embodiment, the disparity may be calculated based on a location of the region of interest 86 in the first field of view 78 and the second field of view 80 relative to a centerline.

The processor 77 may be configured to calculate the distance of the region of interest 86 based on the distance between the cameras 14, 16 and the disparity of the region of interest 86. As the disparity increases, the relative distance of the region of interest 86 from the cameras 14, 16 decreases. As the distance between the cameras 14, 16 increases, the apparent disparity will increase. The distance measurement may be based on a relationship given below, with the camera baseline being the distance between the two cameras 14, 16 lenses, which may be the interocular spacing of the center of the two camera 14, 16 lenses:

$$\text{Distance} \propto ((\text{camera focal length})(\text{camera baseline}))/(\text{disparity})$$

A constant element of the relationship shown above may be automatically determined by the processor 77, or may be input into the processor 77. The camera focal length, and camera baseline, for example, or any other constant elements, may be input into the processor 77 for use in its distance calculation. In one embodiment, the processor 77 may automatically detect constant elements of the relationship above, based, for example, on a particular kind of camera being utilized with the camera device 12. In one embodiment, the processor 77 may automatically detect an orientation of the cameras 14, 16 and/or the distance of the cameras 14, 16 from each other. In one embodiment, the processor 77 may include look-up table stored in memory, which may be used to match stored constants with an input provided by a user. The input may be the type of camera being utilized. In one embodiment, a memory may be used to store any constants or other information used by the processor 77. In one embodiment, a distance relationship may be utilized that includes different constants or variables than identified above.

In one embodiment, the camera device 12 may be configured to be calibrated to allow the processor 77 to calculate the distance relative to a location. FIG. 11, for example, illustrates a table 88 that may be used to calibrate the processor 77. In a process of calibration, a user may set a region of interest at a defined distance. The processor 77 may determine the disparity of the region of interest at that distance. The user may input the distance that corresponds to that disparity into the processor 77, or the processor's memory. The user may repeat this process at varying distances. After calibration, upon the processor 77 calculating a disparity, it may match this disparity to the distance stored in the memory during calibration, to be able to output a distance. A calibration process may allow the processor 77 to more easily account for variations in any constants used to calculate distance. Calibration data may be stored in the memory for different constants, such as the type of camera, camera focal length, camera orientation or distance between the cameras, or other factors. The calibration data may be retrieved by the processor 77 to output a distance based on the calculated disparity.

The location that the processor 77 calculates the distance relative to may be set by default or may be input into the processor 77, or automatically determined by the processor 77. The location may be set during a calibration process. In one embodiment, the location may be set as the position of the taking camera 22. The position of the taking camera 22 may be further defined as either the lens or the sensor plane of the taking camera 22. In one embodiment, the camera device 12 may be configured to couple to the taking camera 22 at a defined position, and the location may be set to be the taking camera 22 based on the defined position. In one embodiment, the location may be input into the processor 77 by inputting a type of taking camera into the processor 77. The processor 77 may include a look-up table providing the position of the taking camera 22, or a component of the camera such as a lens or sensor plane, based on the type of taking camera 22 used. In one embodiment, the location may be set at a different position as desired, for example a user may input the location into the processor 77.

In one embodiment, the camera device 12 may be configured to calculate the distance of a region of interest relative to a location while the region of interest 86 moves. The processor 77 may be configured to track the position of the selected region of interest 86. Referring to FIG. 8, upon the region of interest 86 being selected, the processor 77 may be configured to determine if the region of interest 86 moves. The processor 77 may determine the appearance of the region of interest 86 and then identify the appearance of the region of interest 86 in successive frames to track movement of the region of interest 86. In one embodiment, the processor 77 may track the region of interest by calculating if pixel data has been translated to different pixels than the original pixels. In one embodiment, a different process of tracking the region of interest 86 may be used. The processor 77 may track the region of interest 86 in each frame. In one embodiment, the processor 77 may track the region of interest 86 for a defined interval of frames.

In one embodiment, a separate device, such as a control device, may assist the processor 77 to track the region of interest 86. The separate device may identify movement of the region of interest 86, and the processor 77 may use image data from the subset of pixels representing the region of interest 86 as the region of interest 86 moves, to track the movement of the region of interest 86. The image data from the subset of pixels may be used for comparison with the image from the second field of view 80.

The processor 77 may be configured to track the position of the region of interest 86 in the second field of view 80. The processor 77 may track the position in the second field of view 80 by matching the appearance of the region of interest 86 in the first field of view 78 to the second field of view 80 in a process as discussed above in this application. For example, the processor 77 may use an algorithm to match the appearance of the selected region of interest 86 in the other field of view 82. The algorithm may correlate the appearance of the selected region of interest 86 in the first field of view 78 with the appearance of the selected region of interest 86 in the second field of view 80. The algorithm may be the algorithm shown in FIG. 9, or may be a different algorithm. In one embodiment, the processor 77 may track the region of interest 86 in the second field of view 80 in a process in which data representing the movement of the region of interest 86 in the first field of view 78 is applied to calculate the movement of the region of interest 86 in the second field of view 78. In one embodiment, a different process of tracking the region of interest 86 in the second field of view 78 may be used.

The processor 77 may be configured to calculate a distance of the region of interest 86 relative to a location while the region of interest 86 moves, by comparing a position of the region of interest 86 in the first field of view 78 to the position of the region of interest 86 in the second field of view 80. The distance may be calculated in a process as discussed above in this application. The distance may be calculated in real-time, as the region of interest 86 moves in the first field of view 78 for example. A distance may be calculated for each frame. In one embodiment, a distance may be calculated for a defined interval of frames.

In one embodiment, the camera device 12 may be configured to calculate the distance for a plurality of regions of interest 86. In one embodiment, the processor 77 may be configured to track a plurality of regions of interest 86 and to calculate the distance for a plurality of regions of interest 86. In one embodiment, up to twelve different regions of interest may be tracked and/or have their respective distances calculated. In one embodiment, a greater or lesser number of regions of interest may be tracked and/or have their respective distances calculated. The distances and/or tracking of the plurality of regions of interest may occur simultaneously. The tracking, matching, and distance processes may occur for each region of interest 86 through similar processes as discussed above for the individual regions of interest 86. A distance may be calculated for each region of interest for each frame. In one embodiment, a distance may be calculated for each region of interest for defined interval of frames. In one embodiment, the processor may be configured to produce a disparity map of the disparities for various regions of interest 86.

The camera device 12 may be configured to output the distance data that the processor 77 has calculated.

In one embodiment, the processor 77 may be positioned external to housing 30.

In one embodiment, the distance calculations may be performed using cameras 12, 14 that are not coupled to the housing 30, and/or are positioned in a different orientation than shown in FIG. 2 or 7 for example. The different orientation of the cameras 12, 14 may be utilized by the processor 77 in its distance calculations, for example, a different camera baseline value may be used.

Figure 13:
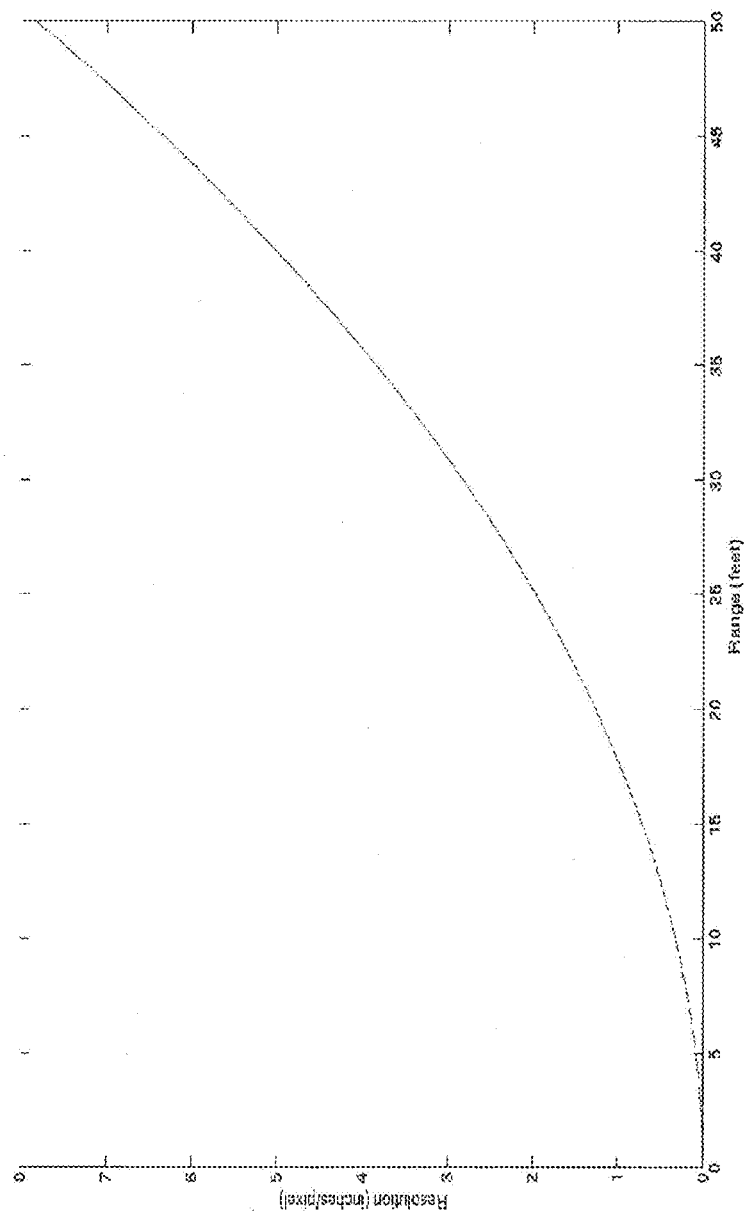
FIG. 13 illustrates a resolution graph according to an embodiment of the present disclosure.

FIG. 12 illustrates a table representing the resolution of the cameras 14, 16 of the camera device 12 at certain defined distances from the camera device 12. FIG. 13 illustrates a graph of the resolution of the cameras 14, 16 of the camera device 12 at certain defined distances from the camera device 12. The data shown in FIGS. 12 and 13 represents one embodiment of the camera device 12, and other resolutions may occur in other embodiments of the camera device 12.

Referring back to FIG. 1, the system 10 may include a control device 18. The control device 18 may be configured to allow a user to select a region of interest. The control data from the control device 18 may be input into the camera device 12 and received by the processor 77. The control device 18 may be connected to the camera device 12 or may be configured to communicate with the camera device 12 wirelessly. The wireless communication device of the camera device 12 may be used to communicate with the control device 18. The control device 18 may include a wireless communication device to communicate with any component of the system 10.

Figure 14:
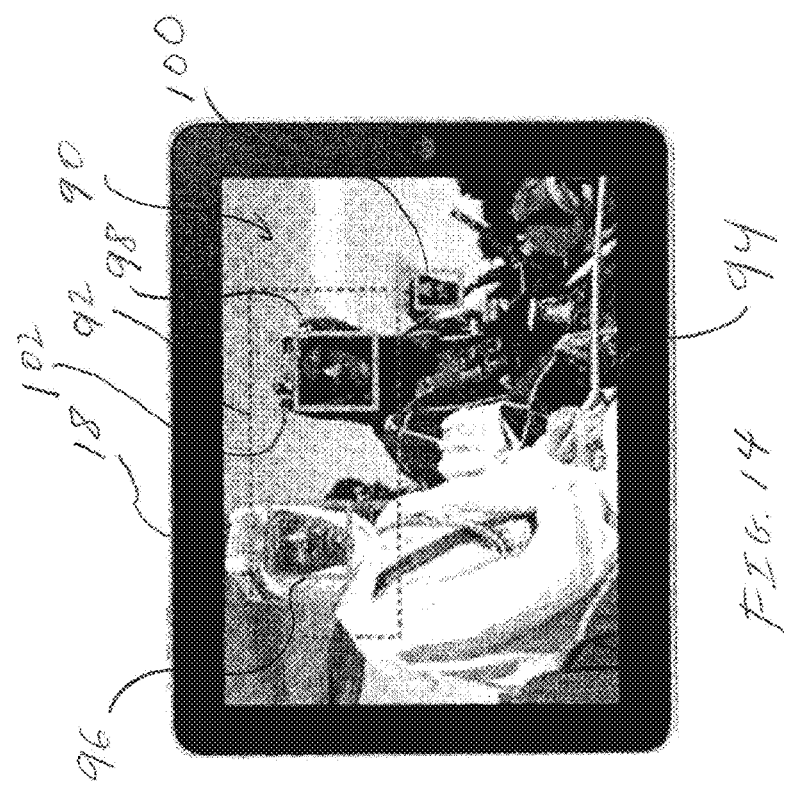
FIG. 14 illustrates an image of an apparatus according to an embodiment of the present disclosure.

FIG. 14 illustrates a close-up view of the control device 18. The control device 18 may be configured as a handheld device, or may be configured as any device configured to control operation of the camera device 12. In the embodiment shown in FIG. 14, the control device 18 is a tablet computer, although other forms of computers may be used if desired, such as a laptop computer. The control device 18 may include a display 90. The display 90 may be configured to display an image of the fields of view 78, 80 from either of the respective cameras 14, 16, and/or a field of view 82 of the taking camera 22. In one embodiment, the display 90 may be configured to display an overlapping portion of the fields of view 78, 80, and/or an overlapping portion of the field of view 82 of the taking camera 22.

In one embodiment, the control device 18 may be configured to produce an indicator 92 that indicates an overlap of any of the fields of views 78, 80, 84. In the embodiment shown in FIG. 14, for example, the indicator 92 indicates the overlap of the taking camera 22 field of view 84 and the first field of view 78. In one embodiment, an overlap between the first field of view 78 and the second field of view 80, and/or an overlap between the taking camera 22 field of view 84 and the second field of view 80 may be indicated. The indicator 92 may take the form of a box on the display 90 as shown in FIG. 14, although in other embodiments other forms of indicators 92 may be used as desired.

The control device 18 may include a touch screen 94 configured for a user to select a region of interest 86. A user may touch a portion of the image from any of the fields of views 78, 80, 84 that displays the desired region of interest 86 to select the region of interest 86. The user may unselect the desired region of interest 86 by touching the image of the region of interest again. In one embodiment, the control device 18 may include facial recognition processes to automatically identify facial features in any of the fields of views 78, 80, 84. The control device 18 may be configured to automatically select regions of interest 86 corresponding to those facial features, or may be configured to suggest regions of interest 86 to the user that correspond to those facial features. In one embodiment, the control device 18 may utilize an alternative method of selecting regions of interest 86, for example, the control device 18 may be configured to respond to a marker used to indicate the region of interest 86. The marker may be a physical structure positioned at the region of interest 86, or may be a light device such as a laser beam aimed at the region of interest 86, or may have another form.

The control device 18 may select multiple regions of interest 86, either automatically or based on user selection. In an embodiment in which the control device 18 includes a touch screen 94, the user may touch multiple portions of the image from any of the fields of views 78, 80, 84 to select the region of interest 86. In one embodiment, up to twelve different regions of interest may be selected. In one embodiment, a greater or lesser number of regions of interest may be selected.

The control device 18 may be configured to produce an indicator 96 that indicates the regions of interest 86 that have been selected. The indicator 96 may take the form of a box on the display 90 as shown in FIG. 14, although in other embodiments other forms of indicators 96 may be used as desired. Additional indicators 98, 100 may be used to indicate the multiple regions of interest 86 that have been selected. In an embodiment in which the processor 77 tracks the movement of a single or multiple regions of interests 86, the corresponding indicators 96, 98, 100 may move with the regions of interest 86.

The control device 18 may be configured to display a distance calculated by the processor 77. The distance may be provided on the display 90. In an embodiment in which the processor 77 provides real time calculations of the distance, the distance displayed on the control device 18 may be updated in real time as well. Multiple distances may be displayed, each corresponding to multiple regions of interest. The control device 18 may display a distance outside of an overlapping portion of the fields of view 78, 80, 84. For example, in FIG. 14 a distance is shown for the indicator 100, which is outside of the field of view 84 of the taking camera 22. This distance may be displayed such that the distance to this region of interest is already displayed, should the field of view 84 of the taking camera 22 be moved to cover this region of interest.

The control device 18 may be configured to receive an input of properties of the cameras 14, 16, or properties of the taking camera 22. The properties may include the focal length of any of the cameras, the field of view of any of the cameras, the distance between the cameras 14, 16, the focus, the iris, and/or the zoom of any of the cameras, and/or type of camera or lens being used, among other properties. The control device 18 may be configured to receive input of the location that the processer 77 calculates a distance relative to. The control device 18 may be configured for a user to input this data into the control device 18.

In one embodiment, the control device 18 may be configured to control properties of the cameras 14, 16, including the focus, iris, and/or zoom of the cameras 14, 16. The control device 18 may be configured such that a user has touch screen control of the properties, including focus, iris, and/or zoom. The control device 18 may be configured to display these properties.

The control device 18 may be configured to display multiple screens of images providing information about the system 10. For instance, one screen as shown in FIG. 14 may display video images of the field of view 78 from the camera 14. The control device 18 may display another screen that provides information regarding the focus, iris, and/or zoom of the cameras 14, 16. The control device 18 may be configured such that a user may change the screen that is displayed on the control device 18.

In one embodiment, the processes of the control device 18 may be embodied in a program that is operated by a processor of the control device 18. The program may be embodied in a non-transitory machine readable medium. The program may be stored in a memory of the control device 18. The program may be configured to be downloadable by the control device 18. The program may be an application or "app" operated by the control device 18. The control device 18 for example may be a tablet computer such as an iPad sold by Apple, or a Galaxy sold by Samsung, and the processes of the control device 18 discussed herein may be loaded onto the control device 18. The program may cause the processor of the control device 18 to effect the processes discussed herein.

In one embodiment, the control device 18 may be coupled to the housing 30 of the camera device 12. In one embodiment, the control device 18 may be integrated within the camera device 12. For example, in one embodiment, a control device 18 integrated within the camera device 12 may serve to automatically detect facial features or other desired features of the region of interest.

The control device 18 may be configured to communicate with the camera device 12 either wirelessly or through a wired connection. The control device 18 may output the selection of the region of interest, the properties of the cameras 14, 16, and/or properties of the taking camera 22 to the camera device 12 or another element of the system 10. The control device 18 may also output the control of the cameras 14, 16 to the camera device 12. The control device 18 may receive data from the control device 18 or other element of the system 10.

In one embodiment, the control device 18 may assist the processor 77 in tracking movement of the region of interest, or multiple regions of interest in a field of view. The control device 12 may be configured to provide data to the processor 77 about the position of the selected region of interest while it moves. For instance, facial recognition features identified by the control device 18 may be provided to the processor 77 to assist the processor 77 in tracking movement of the region of interest.

The control device 18 may be configured to be lightweight and portable, to allow an operator of the control device 18 to more easily move about while operating the camera device 12.

Referring back to FIG. 1, the system 10 may include a display device 20 configured to display a distance to a region of interest calculated by the processor of the system 10, or distances to multiple regions of interest. The display device 20 may be connected to the camera device 12 or may be configured to communicate with the camera device 12 wirelessly. The wireless communication device of the camera device 12 may be used to communicate with the display device 20. The display device 20 may include a wireless communication device to communicate with any other component of the system 10.

Figure 15:
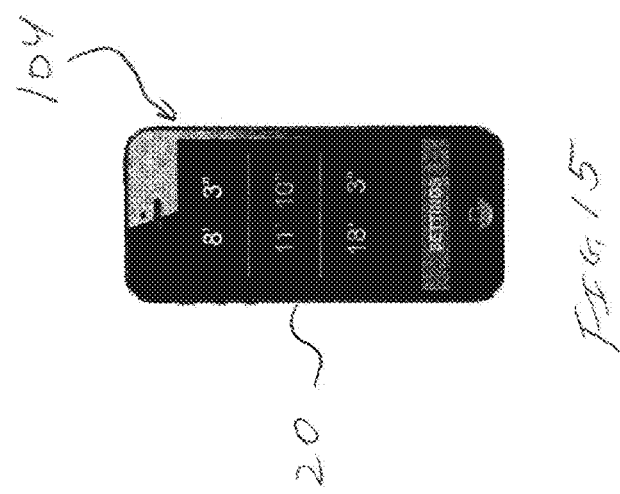
FIG. 15 illustrates an image of an apparatus according to an embodiment of the present disclosure.

FIG. 15 illustrates a close-up view of the display device 20. The display device 20 may be configured as a handheld device, or may be configured as any device configured to display a distance to a region of interest. In the embodiment shown in FIG. 15, the control device 18 is a mobile communication device, although other forms of devices may be used if desired. The control device 18 may be a mobile communication device such as an iPhone, iPod, or other mobile devices. The display device 20 may include a display 104. The display 104 may be configured to display a distance to a region of interest.

The display device 20 may be configured to display a single distance, or multiple distances calculated by the processor 77. The display device 20 may be configured to display the distance or distances as the processor 77 calculates the distances in real time, as the region or regions of interest move. In the embodiment shown in FIG. 15, a multiline display shows distances calculated to different regions of interest. The distances may be divided into primary and secondary regions of interest. The distances may be shown as a numerical value. In one embodiment, another form of indicator of distance may be used, such as a table, chart, or other representative diagram, among others.

Figure 16:
FIG. 16 illustrates an image of an apparatus according to an embodiment of the present disclosure.

The display device 20 may be configured to be lightweight and portable. In one embodiment, the display device 20 may be configured to be integrated within the camera device 12. In one embodiment, the display device 20 may be configured to be coupled to any element of the system 10. FIG. 16, for example, illustrates an embodiment of a display device 106 coupled to a taking camera 22. The distance to the region of interest is indicated on the right side of the display device as being ten feet.

Referring back to FIG. 1, the system may include a display device 24 in the form of an overlay device, for overlaying a distance calculated by the processor 77 on an image from a taking camera 22, or distances to multiple regions of interest. The display device 24 may be connected to the camera device 12 or may be configured to communicate with the camera device 12 wirelessly. The wireless communication device of the camera device 12 may be used to communicate with the display device 24. The display device 24 may include a wireless communication device to communicate with any other component of the system 10.

FIG. 17 illustrates a close-up view of the display device 24, with a lid 108 of a housing 110 separated from the remainder of the housing 110, and other components of the display device 24 separated. The display device 24 may include power connectors 112 that receive power for operating the display device 24. The display device 24 may include data connectors 114 for receiving cabled data from elements of the system 10, including images from the taking camera 22. The display device 24 may include an input device, and may include an output device. In the embodiment shown in FIG. 17, the input device and the output device are a wireless communication device in the form of an antenna 116. In one embodiment, the input device and the output device may comprise connectors such as the connectors 114. In one embodiment, the input device and output device may comprise different structures.

The display device 24 may include an overlay processor card 118. The processor card 118 may include a processor 120 that is configured to overlay the distances calculated from the processor 77 on other images from other cameras. The processor 120 may receive the distance data from the camera device 12 and receive the image from the taking camera 22 for example, and match the distance data to the image. Referring to FIG. 1, the display device 24 may produce indicators that indicate the regions of interest 86 that have been selected. The indicator may take the form of a box as shown in FIG. 1, although in other embodiments other forms of indicators may be used as desired. In an embodiment in which the processor 77 tracks the movement of a single or multiple regions of interests 86, the corresponding indicators may move with the regions of interest 86.

The display device 24 may display the distance or distances calculated by the processor 77 on another display device 28. The distance may be provided on a display of the display device 28. In an embodiment in which the processor 77 provides real time calculations of the distance, the distance displayed on the display device 28 may be updated in real time as well. Multiple distances may be displayed, each corresponding to multiple regions of interest. The display device 24 may be configured to display only the image in the field of view of the taking camera 22. As shown in FIG. 1, the image on the display device 28 matches the image shown within the indicator 92 shown in FIG. 14.

The display device 24 may be configured to be lightweight and portable. FIGS. 18 and 19 illustrate the length of the display device 24 may be approximately 7.37 inches, with a length of the housing 110 being approximately 6.75 inches. The width may be approximately 4.75 inches. The height as shown in FIG. 19 may be approximately 1.35 inches. The dimensions shown in FIGS. 18 and 19 are exemplary, as varied dimensions may be utilized, including a total length of between approximately 5 and 10 inches, a width of between approximately 2 and 7 inches, and a height of between approximately 1 and 3 inches. In one embodiment, dimensions different from those stated herein may be utilized.

Any of the display devices discussed herein may display data associated with taking camera 22 and/or cameras 14, 16 of the camera device 12, such as the make, zoom, iris, and focus of the cameras.

Referring back to FIG. 1, the system may include a camera controller 26 configured to control operation of the cameras 14, 16. The camera controller 26 may be configured to operate features of the cameras 14, 16 including lens control such as iris, focus, and/or zoom. The camera controller 26 may be configured to operate both cameras 14, 16 simultaneously such that the features of the cameras 14, 16 are similar. In one embodiment, the camera controller 26 may be operated via the control device 18.

In one embodiment, the camera controller 26 may be configured to control the taking camera 22 and/or the cameras 14, 16. The camera controller 26 may be configured to operate features of the taking camera 22 including lens control such as iris, focus, and/or zoom, such that these features of the taking camera 22 match the features of the cameras 14, 16. In one embodiment, the camera controller 26 may be configured to automatically adjust the focus of the taking camera 22 based on the distance measurements provided by the camera device 12.

The camera controller 26 may be connected to the camera device 12 or may be configured to communicate with the camera device 12 wirelessly. The wireless communication device of the camera device 12 may be used to communicate with the camera controller 26. The camera controller 26 may include a wireless communication device to communicate with any other component of the system 10. The camera controller 26 may include a wired or wireless connection to the taking camera 22.

In one embodiment, the camera controller 26 may be a motor driver. The motor driver may be a Preston MDR, or other kinds of motor drivers.

The system 10 may include a taking camera 22 that is configured to produce an image in a field of view that overlaps the fields of view of the cameras 14, 16. The image may be a static image, or may be a video image. The taking camera 22 may be of a style that is typically used to film television or motion pictures, and may be a digital or film camera. The taking camera 22 may be configured to output an HD image. The taking camera may include, but is not limited to, an Arri Alexa, a Red Epic, a Sony F55, a Sony F65, a Genesis, and a Panavision film camera, among other kinds of taking cameras.

In one embodiment, the taking camera 22 may be utilized in a defined orientation relative to the camera device 12. For example, the taking camera 22 may be oriented such that the lens of the taking camera 22 is oriented substantially parallel to the respective axes 34, 36 of one or both of the cameras 14, 16. The taking camera 22 may be oriented substantially co-planar with one or both of the cameras 14, 16, being aligned in a substantially similar horizontal, or x-dimension, plane 38 extending out of the page in FIG. 3. The camera sensor of the taking camera 22 may be oriented substantially co-planar with the sensors of one or both of the cameras 14, 16, being aligned in a substantially similar vertical, or y-dimension, plane 44 extending out of the page in FIG. 3. The taking camera 22 may be oriented such that it faces towards the same direction of one or both cameras 14, 16. In one embodiment, the taking camera 22 may be oriented in the manner shown in FIG. 7, with the taking camera 22 positioned between the two cameras 14, 16. The field of view 84 of the taking camera 22 may be positioned centrally and overlap the respective fields of view 78, 80 of the cameras 14, 16.

The taking camera 22 may be coupled to the camera device 12 to retain the desired orientation of the taking camera 22 relative to the camera device 12. In one embodiment, the taking camera 22 may be separate from the camera device 12. Any of the display devices 20, 24, 28, 106 or the control device 18 discussed herein may be coupled to the taking camera 22 as desired.

The calculation of distance performed by the system 10 and/or devices of the system may be used to set the focus of the taking camera 22. During filming, it is pertinent to readily ascertain the distance to regions of interest, to determine how to efficiently set focus of a taking camera 22 to those regions. The system, devices, and processes discussed herein improve the ability to readily ascertain distance, and thus improve the ability to set the focus of a taking camera 22. In one embodiment, the focus of the taking camera 22 may be set by a user, based on the distance calculations provided by the camera device 12. The user may determine the distance calculations by reviewing the output from one of the display devices, or the control device, or another device associated with the system 10. For example, the user may view the distance on display device 28, which shows an overlay of the calculated distance and the image from the taking camera 22. The user may be an individual such as a camera assistant. In one embodiment, the focus of the taking camera 22 may be set automatically based on the distance calculations provided by the camera device 12. For example, the camera controller 26, or other device of the system 10, may automatically adjust the focus.

Additional benefits of the system 10, devices, and processes discussed herein include the ability to select regions of interest based on their appearance, including facial recognition. Additional benefits include the ability to track location of a region or regions of interest as they move. Additional benefits include real time calculations of the distance to a region or regions of interest, which may occur during movement.

The system 10, devices, and processes discussed herein, represent a marked improvement over prior methods of determining distance, including use of acoustic or infrared measurement devices.

Elements of the system 10 may beneficially appear as part of a normal camera system, enhancing the ease of use and marketability of the system. For example, the camera device 12, control device 18, and/or display devices may be coupled to the taking camera 22 to reduce the total number of parts used. Elements of the system 10 may be made portable and preferably lightweight. In one embodiment, the camera device 12 may have a weight of less than approximately four pounds. In one embodiment, the display device 24 may have a weight of less than two pounds.

The system 10 may operate at a distance of between approximately 1 foot and 45 feet, although additional ranges may be utilized as well. The system 10 may beneficially operate at a distance that is with the accuracy of the depth-of-field of the taking camera 22. The system 10 may operate at a luminance level between very dark and bright light, approximately between 10 lux and 25,000 lux. Other luminance levels may be utilized as well.

FIG. 20 illustrates one embodiment of hardware configuration of the camera device 12 and the display device 24. Other hardware configurations may be used in other embodiments. The camera device 12 may use a processor card 76. In one embodiment, the processor card 76 may include up to 2 gigabytes of internal memory, and up to 16 gigabytes of flash memory. In other embodiments, other forms of processor cards 76 may be utilized. In one embodiment, the interface device 72 may be in the form of a PCT USB3 card. In other embodiments, other forms of interface devices may be utilized. The display device 24 may use an overlay processor card 118. In one embodiment, the overlay processor card 76 may include an HD-SDI input, and an HD-SDI output. In other embodiments, other forms of processor cards 76 may be utilized. The display device 24 may include a wireless communication card 122, and a power supply 124.

In one embodiment, the cameras 14, 16 may be configured for binning, windowing and high-speed readout. The cameras 14, 16 may include an image sensor having up to 5 mega-pixels. The cameras 14, 16 may be configured to produce up to 33 images per second, or up to 15 images per second depending on the resolution desired. In other embodiments, the features of the cameras 14, 16 may be varied as desired.

FIG. 21 illustrates one embodiment of wired connections between elements of system 10. Cables may be used to perform the wired connections. Cables for transferring image data may be in the form of HD-SDI cables, although other forms of cables may be used as desired. Power cables may supply power from a battery pack 126, although other forms of power supply may be used as desired.

Figure 22:
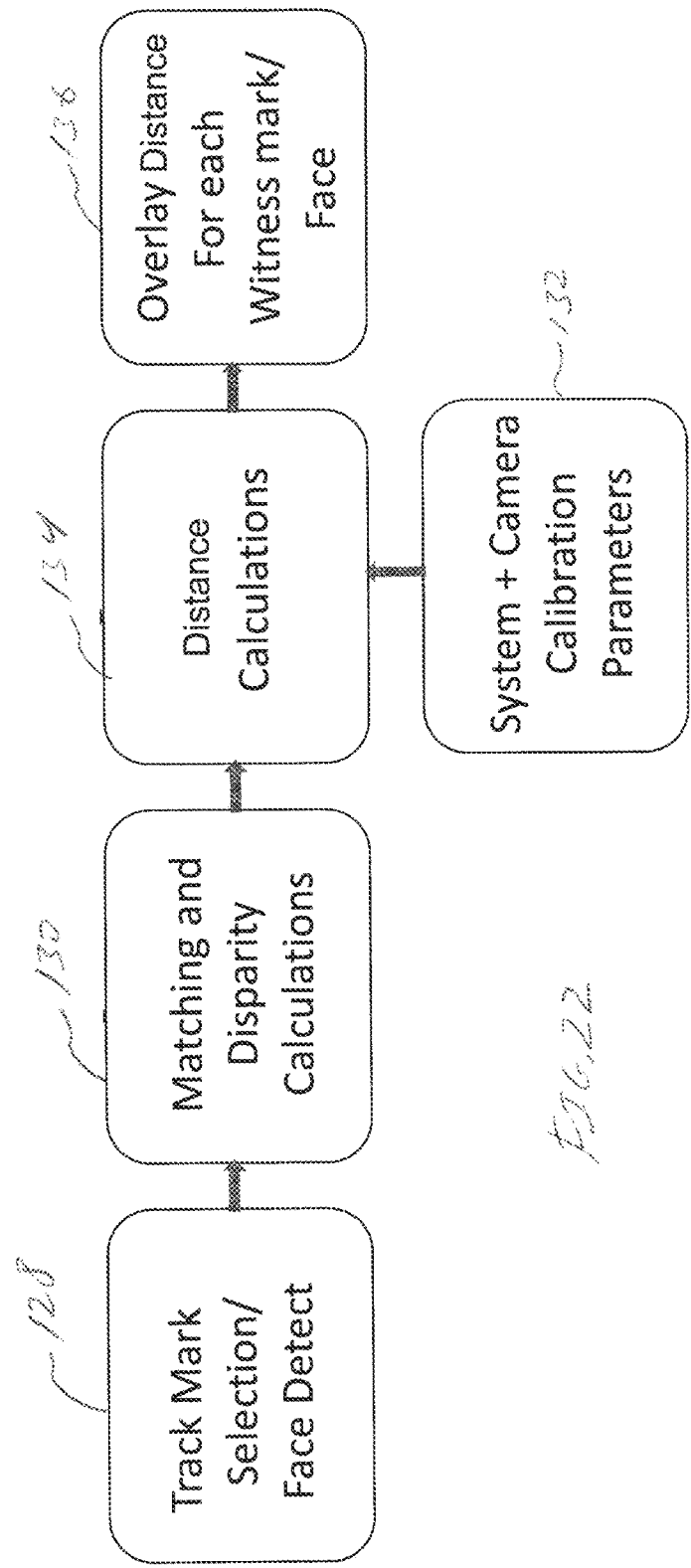
FIG. 22 illustrates a process map, according to an embodiment of the present disclosure.

FIG. 22 illustrates one embodiment of a process map for determining a distance to a region of interest. The process 128 may occur with the selection of one or more regions of interest. Process 128 may occur through use of the control device 18. The process 128 may include a process of facial feature detection, or detection of track marks. The process 130 may occur through use of the camera device 12. The camera device 12 may match the selected region or regions of interest in the first field of view with the second field of view. The camera device 12 may perform disparity calculations. Process 132 may occur through parameters of the system 10 or the cameras of the camera device 12 being input to the camera device 12. Such parameters may include features such as camera baseline, camera focal length, and other features based herein. The process 134 may occur through the camera device 12 calculating the distance or distances to a region or region of interest based on the disparity calculations, and the parameters input in process 132. The process 136 may occur through control device 18 or display device 24 overlaying a distance on an image from one of the cameras 12, 14 or 22. The process of FIG. 22 may be modified to include or exclude steps, and may include any process discussed herein.

FIG. 23 illustrates one embodiment of a process to transfer data to and from the camera controller 26. An element of the system 10 may request focus, zoom, and/or iris data from the camera controller 26. The data may represent the status of the camera device 12 and/or the taking camera 22. The process shown in FIG. 23 may be modified or excluded as desired. FIG. 24 illustrates one embodiment of a process to transfer distance data to the camera controller 26. The process shown in FIG. 23 may be modified or excluded as desired.

Embodiments disclosed herein may include the following processes. Additional processes disclosed herein may be incorporated into the steps listed below:

A method of adjusting focus of a camera may comprise: selecting, with a control device, a region of interest in a first field of view of a first camera; calculating, with a processor, a distance of the selected region of interest relative to a location by comparing a position of the selected region of interest in the first field of view with a position of the selected region of interest in a second field of view of a second camera, the second field of view overlapping at least a portion of the first field of view; and adjusting a focus of a third camera on the selected region of interest based on the distance calculated with the processor.

The method may include a control device including a touch screen configured to display an image of the first field of view produced by the first camera, the region of interest being selected by a user touching a portion of the touch screen that displays the region of interest in the image.

The method may include the first camera and the second camera each being coupled to a housing that retains the first camera and the second camera at a distance from each other.

The method may include a step of calculating that further comprises calculating the distance of the selected region of interest relative to the location based on the distance between the first camera and the second camera.

The method may further comprise a step of displaying the distance calculated with the processor on an overlay of an image produced by the third camera.

The method may further comprise a step of tracking, with the processor, the position of the selected region of interest in the first field of view while the selected region of interest moves in the first field of view.

The method may include a step of calculating that further comprises calculating the distance of the selected region of interest relative to the location in real time while the selected region of interest moves in the first field of view.

The method may further comprise a step of displaying the distance calculated with the processor in real time while the selected region of interest moves in the first field of view.

The method may include a step of displaying that further comprises overlaying the distance calculated with the processor in real time on an image produced by the third camera while the selected region of interest moves in the first field of view.

The method may include the image produced by the third camera is a video image displaying the selected region of interest moving.

Embodiments disclosed herein may include the following apparatus. Additional features disclosed herein may be incorporated into the apparatus listed below:

An apparatus for determining a distance to a region of interest comprising: a housing; a first camera coupled to the housing and oriented to have a first field of view; a second camera coupled to the housing and oriented to have a second field of view that overlaps at least a portion of the first field of view; and a processor coupled to the housing and configured to calculate a distance of a selected region of interest relative to a location by comparing a position of the selected region of interest in the first field of view with a position of the selected region of interest in the second field of view.

The apparatus may be configured wherein the first camera is aligned along a first longitudinal axis and the second camera is aligned along a second longitudinal axis that is substantially parallel to the first longitudinal axis.

The apparatus may be configured wherein the first camera has a first image sensor and the second camera has a second image sensor, the first image sensor being positioned substantially coplanar with the second image sensor.

The apparatus may be configured wherein the first camera has a focal length of between approximately 12 millimeters and 16 millimeters, inclusive, and the second camera has a focal length of between approximately 12 millimeters and 16 millimeters, inclusive.

The apparatus may be configured wherein the first field of view includes a horizontal dimension and a vertical dimension, and the second field of view includes a horizontal dimension and a vertical dimension; and the processor is further configured to calculate the distance of the selected region of interest relative to the location by comparing the position of the selected region of interest in the horizontal dimension of the first field of view with the position of the selected region of interest in the horizontal dimension of the second field of view.

The apparatus may be configured wherein the processor is further configured to track the position of the selected region of interest in the first field of view while the selected region of interest moves in the first field of view.

The apparatus may be configured wherein the processor is configured to calculate the distance of the selected region of interest relative to the location in real time while the selected region of interest moves in the first field of view.

The apparatus may further comprise an input device coupled to the housing and configured for receiving data indicating the selected region of interest.

The apparatus may be configured wherein the input device is a wireless communication device.

The apparatus may further comprise an output device coupled to the housing and configured for outputting data indicating the distance calculated by the processor.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary. The terms "approximate[ly]" and "substantial[ly]" represent an amount that may vary from the stated amount, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A system for determining a distance to a region of interest comprising:
   a first camera configured to have a first field of view;
   a second camera configured to have a second field of view that overlaps at least a portion of the first field of view;
   a control device configured to allow a user to select a region of interest in the at least a portion of the first field of view that overlaps the second field of view, wherein the control device is a display device configured to enable the user to select the region of interest; and
   a processor configured to calculate a distance of the selected region of interest relative to a location by comparing a position of the selected region of interest in the first field of view with a position of the selected region of interest in the second field of view;
   wherein the control device is configured to allow a user to select a plurality of regions of interest in the at least a portion of the first field of view that overlaps the second field of view; and
   wherein the processor is configured to calculate a distance for each one of the plurality of selected regions of interest relative to a location by comparing a position of each one of the plurality of selected regions of interest in the first field of view with a position of a corresponding one of the plurality of selected regions of interest in the second field of view.

2. The system of claim 1, further comprising a housing retaining the first camera and the second camera at a distance from each other.

3. The system of claim 2, wherein the processor is configured to calculate the distance of the selected region of interest based on the distance between the first camera and the second camera.

4. The system of claim 2, wherein the housing retains the first camera and the second camera in an orientation such that the second field of view overlaps the at least a portion of the first field of view.

5. The system of claim 1, wherein the processor is further configured to identify the position of the selected region of interest in the second field of view by using an algorithm that correlates an appearance of the selected region of interest in the first field of view with an appearance of the selected region of interest in the second field of view.

6. The system of claim 1, wherein the processor is further configured to track the position of the selected region of interest in the first field of view while the selected region of interest moves in the first field of view.

7. The system of claim 6, wherein the processor is further configured to track the position of the selected region of interest in the second field of view by using an algorithm that correlates an appearance of the selected region of interest in the first field of view with an appearance of the selected region of interest in the second field of view.

8. The system of claim 7, wherein the processor is configured to calculate the distance of the selected region of interest relative to the location in real time while the selected region of interest moves in the first field of view.

9. The system of claim 8, wherein the display device comprises an overlay device configured to overlay the distance calculated by the processor in real time on an image produced by a third camera while the selected region of interest moves in the first field of view.

10. A system for determining a distance to a region of interest comprising:
    a first camera configured to have a first field of view;
    a second camera configured to have a second field of view that overlaps at least a portion of the first field of view;
    a control device configured to allow a user to select a region of interest in the at least a portion of the first field of view that overlaps the second field of view, wherein the control device is a display device configured to enable the user to select the region of interest; and
    a processor configured to calculate a distance of the selected region of interest relative to a location by comparing a position of the selected region of interest in the first field of view with a position of the selected region of interest in the second field of view;
    wherein the first field of view includes a horizontal dimension and a vertical dimension, and the second field of view includes a horizontal dimension and a vertical dimension; and
    wherein the processor is further configured to calculate the distance of the selected region of interest relative to the location by comparing the position of the selected region of interest in the horizontal dimension of the first field of view with the position of the selected region of interest in the horizontal dimension of the second field of view.

11. A system for determining a distance to a region of interest comprising:
    a first camera configured to have a first field of view;
    a second camera configured to have a second field of view that overlaps at least a portion of the first field of view;
    a control device configured to allow a user to select a region of interest in the at least a portion of the first field of view that overlaps the second field of view, wherein the control device is a touch screen configured to display an image and allow the user to select the region of interest by touching a portion of the touch screen that displays the region of interest in the image;
    a processor configured to calculate a distance of the selected region of interest relative to a location by comparing a position of the selected region of interest in the first field of view with a position of the selected region of interest in the second field of view; and
    a third camera, wherein the location comprises an element of the third camera.

12. The system as recited in claim 11, wherein the distance that is calculated is used to adjust a feature of the third camera.

13. A system for determining a distance to a region of interest comprising:
    a first camera having a first field of view;

a second camera having a second field of view that overlaps a portion of the first field of view;

a user input that displays one or more regions of interest within one or both of the first and second fields of views, wherein the user input enables a user to select a region of interest from the displayed one or more regions of interest; and a processor that calculates a distance of a selected region of interest relative to a location by comparing a position of the selected region of interest in the first field of view with a position of the selected region of interest in the second field of view;

wherein the processor calculates the distance of the selected region of interest relative to the location in real time while the selected region of interest moves.

14. A method for determining a distance to a region of interest comprising the steps of:

projecting a first field of view from a first camera and a second field of view from a second camera such that there is an overlapping portion of the first and second fields of view;

displaying one or more regions of interest in the overlapping portion on a display device;

selecting a region of interest from the one or more regions of interest displayed on the display device by user input; and determining a distance of the selected region of interest relative to a location by identifying the position of the selected region of interest in the second field of view by correlating an appearance of the selected region of interest in the first field of view with an appearance of the selected region of interest in the second field of view, wherein the location comprises an element of a third camera.

15. A system for determining a distance to a region of interest comprising:

a first camera configured to have a first field of view;

a second camera configured to have a second field of view that overlaps at least a portion of the first field of view;

a control device configured to allow a user to select a region of interest in the at least a portion of the first field of view that overlaps the second field of view, wherein the control device is a display device configured to enable the user to select the region of interest;

a processor configured to calculate a distance of the selected region of interest relative to a location by comparing a position of the selected region of interest in the first field of view with a position of the selected region of interest in the second field of view;

wherein the processor is further configured to track the position of the selected region of interest in the first field of view while the selected region of interest moves in the first field of view;

wherein the processor is further configured to track the position of the selected region of interest in the second field of view by using an algorithm that correlates an appearance of the selected region of interest in the first field of view with an appearance of the selected region of interest in the second field of view; and wherein the processor is further configured to calculate the distance of the selected region of interest relative to the location in real time while the selected region of interest moves in the first field of view.

* * * * *